United States Patent [19]
Sekiya et al.

[11] Patent Number: 6,097,940
[45] Date of Patent: Aug. 1, 2000

[54] VEHICLE INFORMATION COMMUNICATION SYSTEM

[75] Inventors: Masahiro Sekiya; Shinichi Miyazaki, both of Kanagawa-ken, Japan

[73] Assignee: Nissan Motor Co., Ltd., Kanagawa-ken, Japan

[21] Appl. No.: 08/989,851

[22] Filed: Dec. 12, 1997

[30] Foreign Application Priority Data

Dec. 12, 1996 [JP] Japan .................................. 8-332398

[51] Int. Cl.$^7$ ...................................................... H01S 4/00
[52] U.S. Cl. ........................ 455/411; 455/435; 455/431; 455/456
[58] Field of Search ................................. 455/435, 431, 455/456, 404, 521, 575, 564, 550, 345, 557, 411

[56] References Cited

U.S. PATENT DOCUMENTS

| | | | |
|---|---|---|---|
| 4,718,108 | 1/1988 | Davidson et al. | 455/17 |
| 5,450,471 | 9/1995 | Hanawa et al. | 379/58 |
| 5,519,761 | 5/1996 | Gilhousen | 379/59 |
| 5,559,865 | 9/1996 | Gilhousen | 379/60 |
| 5,887,258 | 3/1999 | Lemozit et al. | 455/431 |

*Primary Examiner*—Wellington Chin
*Assistant Examiner*—Sheila B. Smith
*Attorney, Agent, or Firm*—McDermott, Will & Emery

[57] ABSTRACT

A vehicle information communication system determines whether or not an identifier code such as a telephone number is different from that currently registered in a vehicle-equipped information communication system wherein the vehicle belongs to a group of previously registered telephone numbers when a portable telephone having such telephone number is connected thereto, then considers that another portable telephone of a regular user is connected thereto if such telephone number belongs to the group, and then transmits such telephone number of another portable telephone to an information center. The information center can automatically update the currently registered telephone number to a new telephone number when it receives the new telephone number. Accordingly, a vehicle information communication function can be used by a user in a similar manner when the user who has a plurality of individual portable telephones uses the same vehicle.

18 Claims, 5 Drawing Sheets

VEHICLE INFORMATION COMMUNICATION SYSTEM

RELATED APPLICATION

The content of application No. TOKUGANHEI 8-332398, filed on Dec. 12, 1996 in Japan is hereby incorporated by reference.

BACKGROUND OF THE INVENTION

1. Field of the Invention

The present invention relates to a vehicle information communication system which enables mutual individual communication between a large number of vehicle-equipped information communication systems and a remote information center.

2. Description of the Related Art

In the prior art, vehicle information communication systems are known which enable mutual communication between a large number of vehicles and an information center located in a remote place. The present invention provides an improved and unique communication system which provides advantages over prior art systems.

SUMMARY OF THE INVENTION

In vehicle information communication systems of the prior art, many disadvantages are apparent. Thus, if the same vehicle is commonly used by a plurality of users who have their own individual transceivers, a portable telephone which has a telephone number different from the telephone number registered in the database of an information center may not establish contact between the information center and the vehicle since the telephone number in the vehicle is different from that registered in the information center. Therefore, there is a drawback in convenience.

The present invention has been made in view of the above and other disadvantages of the prior art, and it is therefore an object of the present invention to provide a vehicle information communication system which is capable of communicating with a communication controller of a concerned vehicle even when a transceiver having a different identifier is connected to the communication controller of the same vehicle. In this application, the identifier is referred to interchangeably as ID number or ID code and may be any desirable identifying number such as a telephone number.

A main feature of the present invention is that if a signal indicate that a transceiver with a new ID number is connected, it is transmitted automatically from the communication controller to the information center, and the ID number of the transceiver having a different ID number is connected to the communication controller of the same vehicle.

A first feature of the present invention is that a signal indicating that the transceiver having a new ID number is connected is transmitted automatically from the communication controller to the information center, and the ID number of the transceiver assigned to the vehicle and registered in the database of the information center is rewritten to a new ID number, so that the information center can communicate with the communication controller continuously.

It is another object of the present invention to provide a vehicle information communication system in which respective ID numbers of a plurality of transceivers which will be connected to the communication controller of the vehicle are previously registered in a registered ID number group, and, if an ID number does not coincide with a currently registered ID number when the transceiver with the ID number which does not belong to the registered ID number group is connected, a signal indicating that a transceiver with a new ID number is connected, is transmitted from the communication controller to the information center. Therefore, the ID number of the transceiver assigned to the vehicle and registered in the database of the information center is rewritten to a new ID number, so that the information center can communicate with the communication controller continuously.

In the vehicle information communication system according to the present invention, when a transceiver which has an ID number different from that of the transceiver having the ID number currently registered to execute the communication is connected to the communication controller of the same vehicle, the ID number collator detects that the transceiver with a different ID number is newly connected and then transmits that new ID number as well as the vehicle identification code to the information center. When the new ID number is received, the information center collates it with a plurality of registered ID numbers, then considers it as the ID number of the regular user if it coincides with any one of the registered ID numbers, and then updates the currently registered ID number for communication to the new ID number automatically to enable the use of a communication device such as a portable telephone, radio telephone or similar device. However, unless the ID number of the newly connected transceiver coincides with any ID number of a plurality of transceivers scheduled to be used (unless it coincides with any of registered ID numbers), automatic updating of the ID numbers to execute the communication is inhibited.

Accordingly, even when a transceiver which has an ID number different from that of the transceiver having an ID number currently registered to execute the communication is connected to the communication controller of the same vehicle, two-way communications can be established between the communication controller and the information center if an identifier such as a telephone number is that of the regular user registered in the information center. A vehicle information communication function can be equally used if the same vehicle is used by the user who has a plurality of individual transceivers. In addition, if a transceiver with an ID number which is not registered as the ID number scheduled to be used in the information center is connected to the communication controller, the vehicle information communication system can be prevented from being used by an unauthorized user and security can be assured since the ID number to execute the communication cannot be automatically updated.

According to another feature of the present invention, ID numbers of a plurality of transceivers scheduled to be used in a vehicle can be previously registered in the communication controller of a vehicle as an ID number group. The ID number collator then collates whether or not the ID number belongs to the registered ID number group. When a transceiver, which has an ID number different from that of the transceiver having an ID number currently registered to execute the communication, is connected to the communication controller of the same vehicle, then the ID number of the newly connected transceiver is transmitted to the information center if the ID number belongs to the registered ID number group. When the new ID number is received, the information center updates the currently registered ID number to execute the communication to the new ID number automatically. However, unless the ID number of the newly connected transceiver is an ID number which belongs to the registered ID number group, the communication controller does not transmit the ID number to the information center.

Accordingly, even when a transceiver which has an ID number different from that of the transceiver which has ID numbers currently registered to execute the communication, is connected to the communication controller of the same vehicle, two-way communications can be established between the communication controller and the information center if the telephone number belongs to the ID number group registered as the ID number of the transceiver scheduled to be used in the vehicle. Further, a vehicle information communication function can also be used if the same vehicle is used by the user who has a plurality of individual transceivers. In addition, if a transceiver with an ID number which does not belong to the registered ID number group is connected to the communication controller, the vehicle information communication system can be prevented from being used by the unauthorized user and security can be assured since the ID number to execute the communication cannot be automatically updated.

According to still another feature of the present invention, a portable telephone can be used as the transceiver and the telephone number of the portable telephone can be used as the ID number.

Therefore, a vehicle information communication system which employs an existing portable telephone using a radio communication signal can be established.

DETAILED DESCRIPTION OF THE INVENTION

Embodiments of the present invention will be explained in detail with reference to accompanying drawings hereinafter.

The present invention provides a communication system for communicating information between a central communication terminal and a vehicle, comprising:

(a) a communication device, preferably portable, having an identifier code or number peculiar to said communication device, e.g., a portable telephone and telephone number;

(b) a communication controller disposed in the vehicle to control communication with the central communication terminal, the communication controller being connectable to the communication device;

(c) said communication controller having command logic that will command said communication device to transmit said identifier number to the central communication terminal in response to connection of the communication device with the communication controller;

(d) a communication apparatus disposed in the central communication terminal for transmitting/receiving information to/from the communication device, the communication apparatus adapted to receive the identifier number sent by the communication device; and (e) a first memory for storing ID codes (ID memory) disposed in the communication apparatus for storing the ID code received by the communication apparatus, wherein the communication apparatus has paging logic that pages the communication device on command using the ID code stored in the first ID memory.

Figure 5:
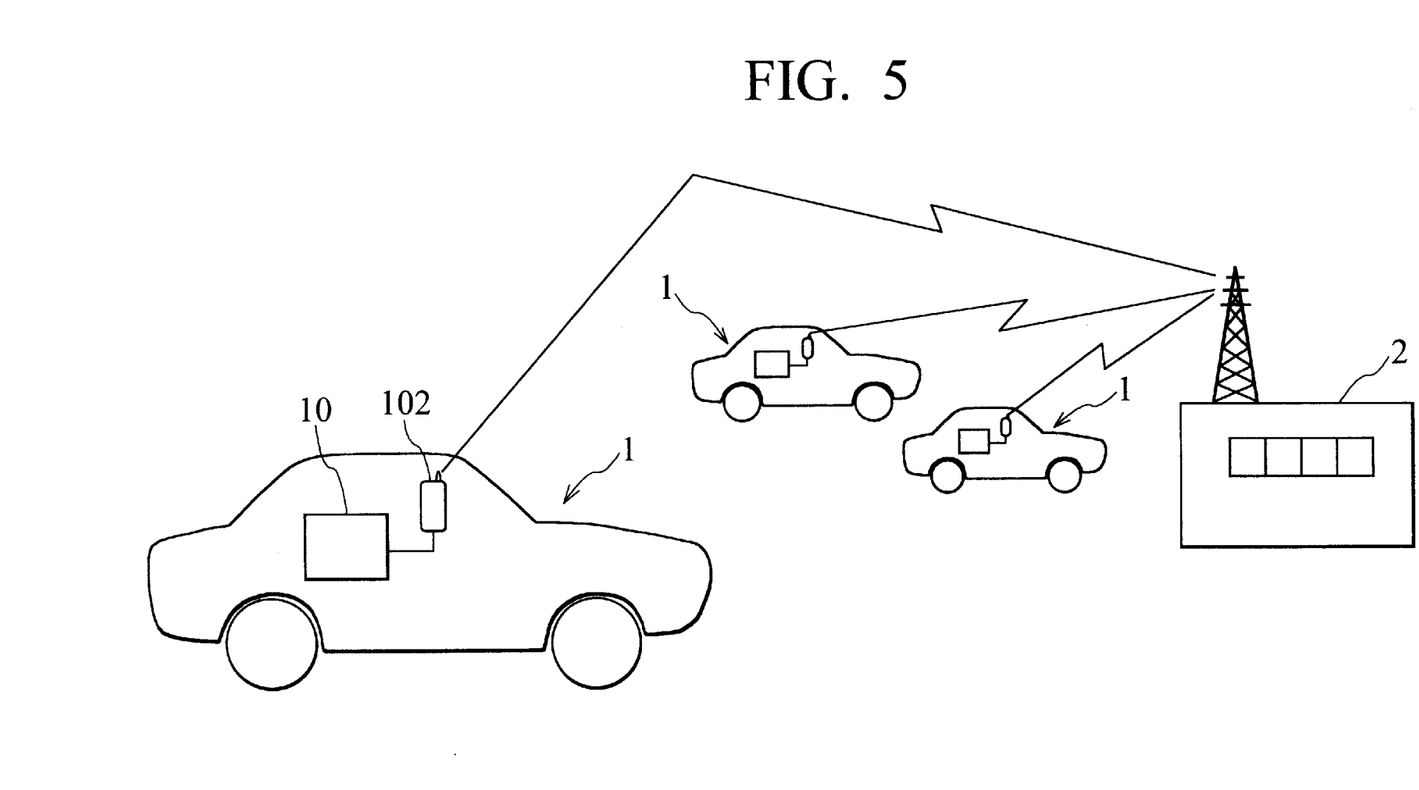
FIG. 5 is a schematic view showing vehicles and an information center for use in the vehicle information communication system according to the first embodiment of the present invention.

Referring to FIG. 5, a vehicle information communication system according to a first embodiment of the present invention comprises a vehicle-equipped communication controller 10 installed in one or a number of vehicles 1 which are to make contact with a central communication terminal 2 respectively, a portable telephone 102, a central communication terminal 2 located in a remote location and serving as an information center, etc.

Figure 1:
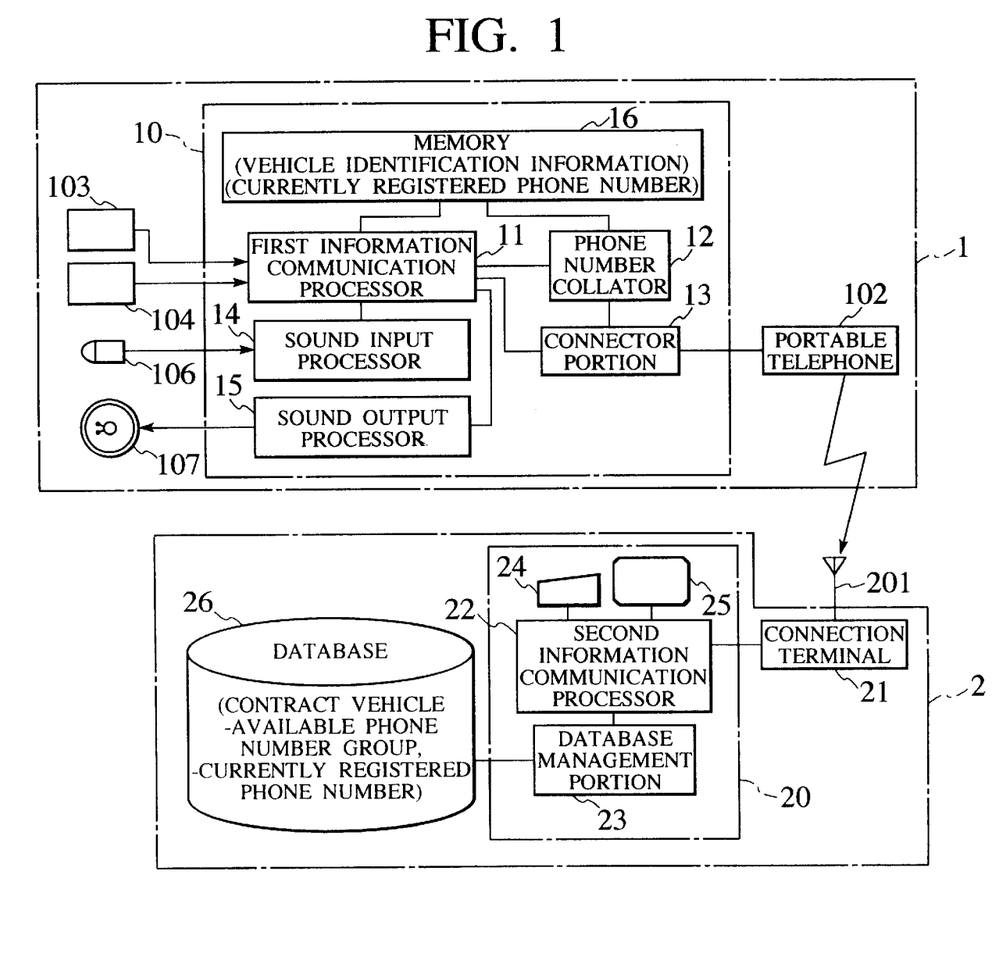
FIG. 1 is a block circuit diagram showing a functional configuration of a vehicle information communication system according to a first embodiment of the present invention.

A functional configuration of the vehicle information communication system according to a first embodiment of the present invention is shown in FIG. 1. The vehicle-equipped communication controller 10 comprises a first information communication processor 11 capable of processing all vehicle information communication processes, a telephone number collator 12 for collating one or more telephone numbers of a portable telephone 102 connected to the communication controller 10 with currently registered telephone numbers, a connector 13 to enable mutual communication between the first information communication processor 11 and the portable telephone 102, a sound input processor 14 for inputting a sound signal from a microphone 106, and a sound output processor 15 for outputting the sound signal to a speaker 107. In a memory 16 which is controlled by the first information communication processor 11, one or a plurality of information such as a vehicle registration number or a vehicle identification code for the vehicle, an owner name, vehicle type, vehicle body number, serial number, etc. are registered and a telephone number of the connected portable telephone 102 are also stored. In addition, an antenna 201 may be connected to the first information communication processor 11. The antenna 201 is connected via an antenna terminal of the portable telephone 102 and the connector portion 13. The antenna 201 can enhance transmission and reception sensitivity in an area where electrical waves are weak, and the like.

A connection terminal 21 serving as a communication terminal on the central communication terminal 2 can communicate with the portable telephones 102 installed on a number of vehicles 1 via an antenna 201. An operation terminal 20 is made of a second information communication processor 22 for taking charge of vehicle information communication processes between the central communication terminal 2 and a large number of vehicles 1 as a whole, a database management portion 23 for managing the database 26, a keyboard 24 for inputting necessary information, and a display device 25. In the database 26 are stored vehicle identification codes, e.g., vehicle body numbers, license numbers, etc., of the contract vehicles 1, telephone numbers of the portable telephones 102 which may be used in the vehicles 1 having the vehicle identification codes registered on contact or after contact, and data tables corresponding to the telephone numbers of the portable telephones registered to execute current communication. A connection apparatus comprises the operation terminal 20, the connection terminal 21 and the database 26.

Although constituent elements have been explained with respect to their functions in the above description, these functions can be implemented by software in the actual communication system. Therefore, from a hardware aspect, the vehicle 1 can comprise one or a plurality of processing units, one or more memories for storing programs of other circuit elements required in connection with the programs, whereas the central communication terminal 2 can comprise a computer system having a size to correspond to the scale of the vehicle information communication system.

Next, operation of the vehicle information communication system as constructed above will be explained. First of all, the first information communication processor 11 can automatically read the telephone number of a connected portable telephone 102 by inputting manually an instruction or by connecting the portable telephone 102 to the communication controller 10, and then registering the telephone number in the memory 16 as an ID code ID2. An identification code Comm1 is also registered in the memory 16 by manual input. The vehicle identification codes Comm1, being newly registered by manual input, a telephone number group ID-Grp of the portable telephones 102 which are available for the vehicle 1 having the vehicle identification codes Comm1, and a telephone number ID2 of the portable telephone used first, are registered into the database 26 of the central communication terminal 2. With regard to registration of the telephone number in the central communication terminal 2, a new registration may be executed automatically by using the present system. However, such procedures are not limited to those described herein. Thus, there is provided an initial set state of the vehicle information communication system according to the first embodiment of the present invention.

Figure 2:
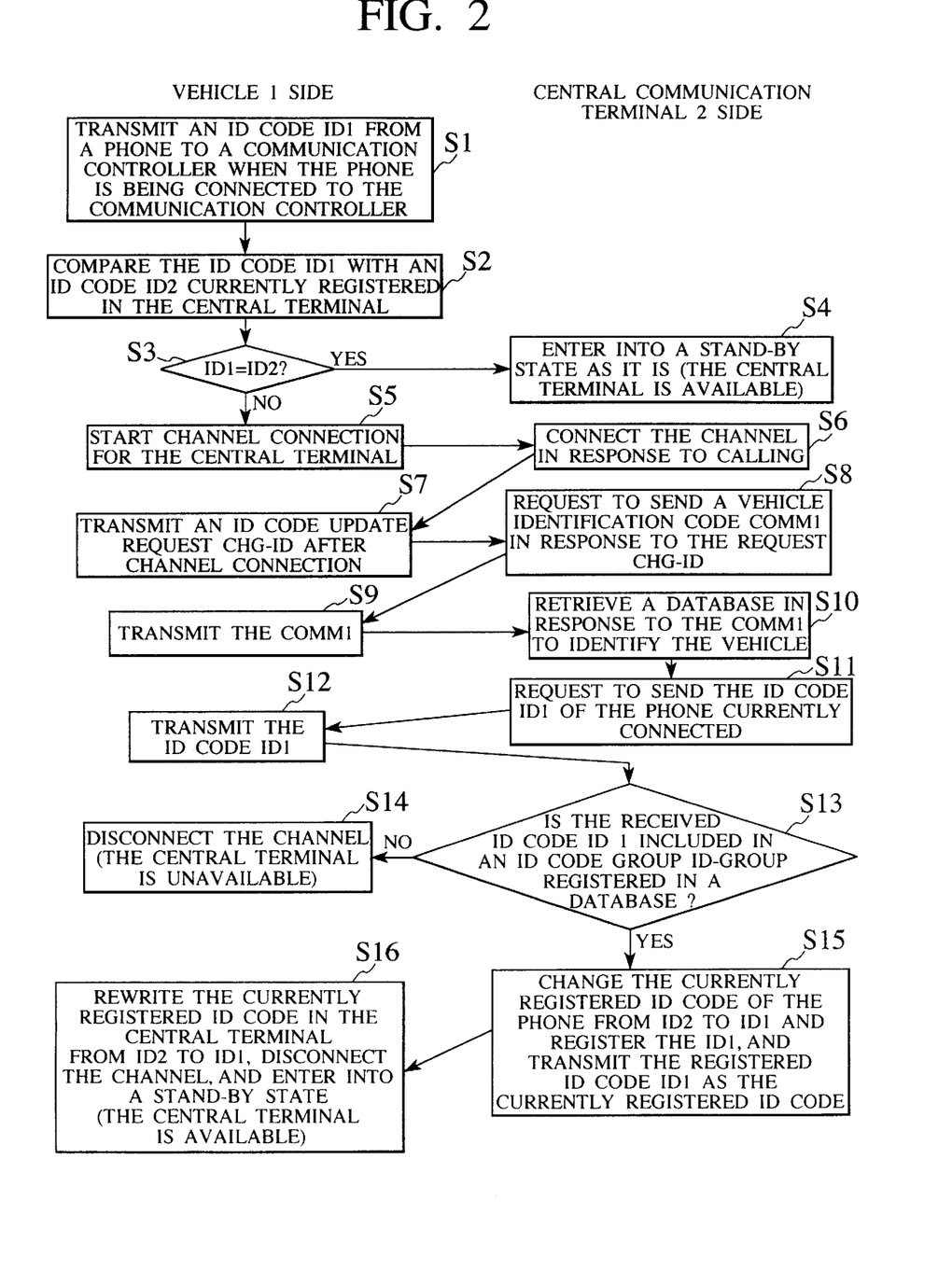
FIG. 2 is a flow chart illustrating an operation of a vehicle information communication system according to the firs embodiment of the present invention.

A process executed when the portable telephone 102 is newly connected to the communication controller 10 will be explained with reference to a flow chart shown in FIG. 2 hereunder. When the portable telephone 102 having the same or different telephone number is newly connected to the communication controller 10, the telephone number collator 12 in the communication controller 10 receives the telephone number as an ID code ID1 transmitted from the portable telephone 102 via the connector portion 13 (step S1). The ID code ID1 is compared with a currently registered telephone number ID2 (which is the same as registered in the central communication terminal 2 and is the telephone number of the portable telephone which was previously connected) (step S2).

If ID1=ID2 according to this comparison (step S3), then the first information communication processor 11 is informed of satisfied collation and the first information communication processor 11 causes the communication controller 10 to enter into its stand-by state since the portable telephone 102 was previously connected. In this case, because the portable telephone 102 is a regularly registered portable telephone 102, service by communication with the central communication terminal 2 is available (step S4).

However, if ID1≠ID2 according to the above comparison (step S3), then the telephone number of the newly connected portable telephone 102NEW is updated and registered in the central communication terminal 2 to correspond to the concerned vehicle 1. Thus, when a portable telephone 102NEW having another telephone number is newly connected and is a previously registered one, two-way communications of the vehicle information are provided for by the following operations. To that end, at first, the telephone number collator 12 informs the first information communication processor 11 of unsatisfied collation. The first information communication processor 11 then reads out the telephone numbers in the central communication terminal 2 from the memory 16 and then transmits it to the newly connected portable telephone 102NEW via the connector portion 13. The first information communication processor 11 thus commands the portable telephone 102NEW to start a channel connection for the central communication terminal 2 (step S5). The channel connection between the central communication terminal 2 and the portable telephone 102NEW can be then established in response to calling (step S6). The communication controller 10 then transmits a telephone number update request Chg-ID to the central communication terminal 2 via the portable telephone 102NEW (step S7).

The central communication terminal 2 then requests that a vehicle identification code Comm1 be sent in response to this update request Chg-ID (step S8), since the second information communication processor 22 will identify the vehicle 1 which is now in communication. The first information communication processor 11 in the vehicle 1 retrieves the vehicle identification code Comm1 identifying the concerned vehicle in the memory 16, and then transmits it via the portable telephone 102NEW (step S9).

When the vehicle identification code Comm1 is received, the second information communication processor 22 in the central communication terminal 2 retrieves the database 26 via the database management portion 23 to determine whether or not the concerned vehicle 1 is a previously registered vehicle (step S10). After the vehicle 1 has been identified, the second information communication process 22 then requests the telephone number ID1 of the portable telephone 102NEW which is currently connected to the vehicle 1 (step S11).

When the communication controller 10 in vehicle 1 transmits the telephone number ID1 of the new portable telephone 102NEW (step S12), the second information communication processor 22 in the central communication terminal 2 then collates the new telephone number ID1 with a connectable telephone number group ID-grp which is currently registered, to determine whether or not the received telephone number ID1 is included in the telephone number group ID-grp registered in the database 26 (step S13). If the received telephone number ID1 is not registered, the new portable telephone 102NEW is regarded as an irregular or improper use and the channel is then disconnected (step S14). However, if a telephone number which coincides with the telephone number ID1 is included in the connectable telephone number group ID-grp, then the new portable telephone 102NEW is regarded as a regular user and the telephone number ID2, which has been registered to carry out the communication, is updated to the newly received telephone number ID1. That is, the currently registered telephone number ID2 of the telephone is changed to the telephone number ID1 and the telephone number ID1 is registered, and the registered telephone number ID1 is then transmitted to the vehicle 1 as the currently registered ID code. This informs the vehicle 1 that the telephone number of the new portable telephone 102NEW is changed to the ID1 (step S15).

In response to this, the first information communication processor 11 in vehicle 1 rewrites the currently registered telephone number ID2, which is now registered in the memory 16, as the telephone number for communication to the ID1, then disconnects the channel, and then enters into a stand-by state (step S16).

After a series of these procedures have been completed, the communication controller 10 can be connected via the portable telephone 102NEW, newly connected to the concerned vehicle 1, by calling the newly registered telephone number ID1 if an emergency call is needed from the central communication terminal 2. On the contrary, the communication controller 10 can call the central communication terminal 2 to request necessary information. In the event that an emergency situation in vehicle 1 occurs, the communication controller 10 can also call the central communication terminal 2 automatically.

Therefore, in the vehicle information communication system according to the first embodiment, even if the same vehicle is used by a plurality of users who have their own portable telephones 102, 102NEW respectively, there is no necessity to purposely exchange the portable telephone being used with another portable telephone regularly registered when the user drives the vehicle. As a result, convenience of the vehicle information communication system can be improved. In addition, even when a user who is not regularly authorized connects his or her portable telephone to the communication controller, the channel is forcibly disconnected so as not to be used unless the telephone number is registered in the central communication terminal 2 as the available telephone number of the portable telephone. Therefore, illegal use of the vehicle information communication system can be prevented, so that a situation will be prevented where personal information of a regular user is drawn out and no particular burden is imposed on the regular user.

A second embodiment of the present invention will be explained with reference to FIGS. 3 and 4 hereunder. A feature of the vehicle information communication system according to the second embodiment of the present invention is in that, unlike the first embodiment, in order to enhance information security, telephone numbers of a plurality of portable telephones 102, which have the possibility of being connected to the communication controllers 10 of contract vehicles to use the vehicle information communication system, are registered in advance in a memory 18 of the communication controller 10 as a telephone number group ID-grp. In this case, the newly connected telephone number is collated with the registered telephone number group whether or not such newly connected telephone number is included in the registered telephone number group. When a new portable telephone 102NEW having a different telephone number from that of the previously used portable telephone 102 is used, then the portable telephone 102NEW can be regarded as a regularly authorized one if the newly connected telephone number is included in the registered telephone number group. In this way, two-way communications are carried out between the vehicle 1 and the central communication terminal 2 as in the first embodiment. The currently registered telephone number ID2 can thus be updated and registered to enable use of the vehicle information communication system.

Figure 3:
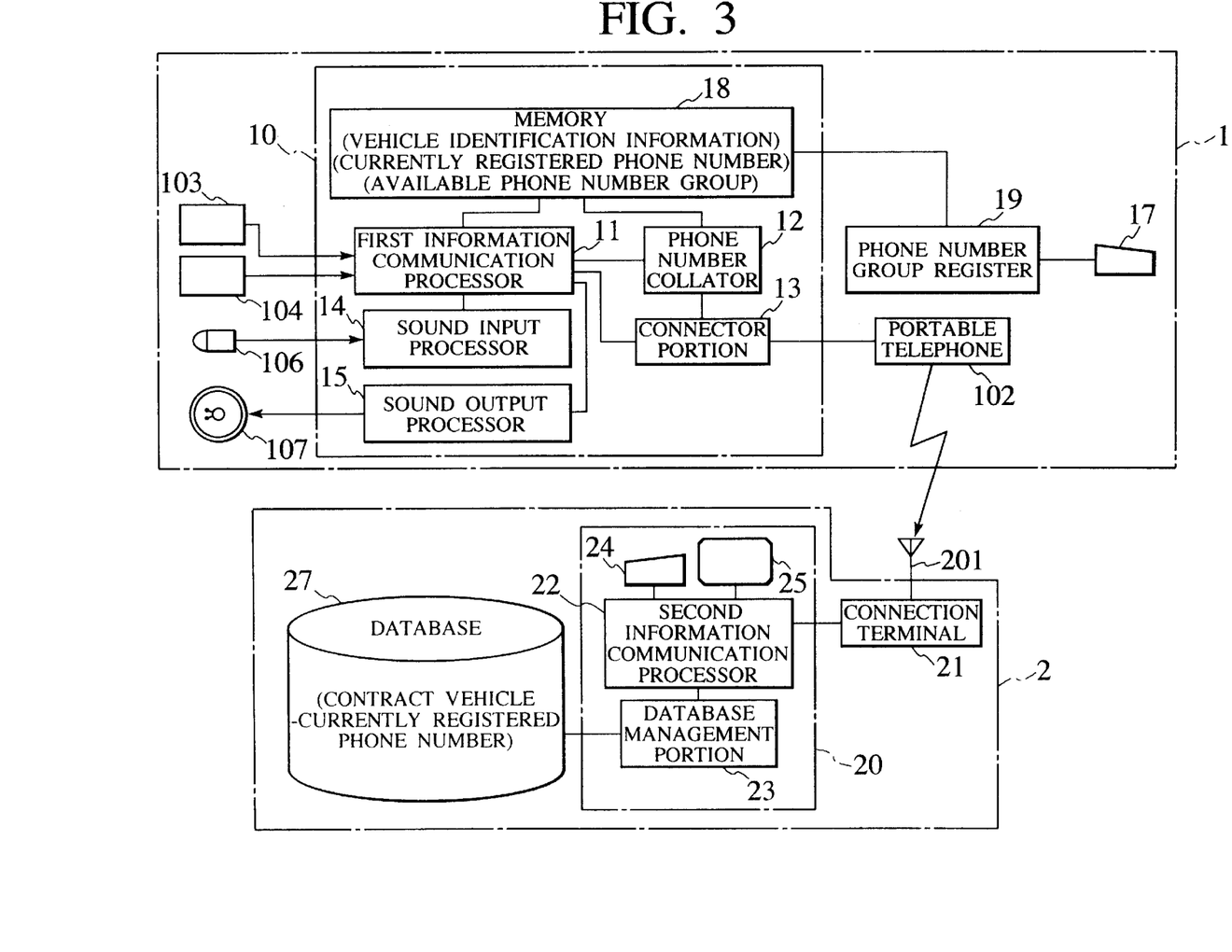
FIG. 3 is a block circuit diagram showing a functional configuration of a vehicle information communication system according to a second embodiment of the present invention.
Figure 4:
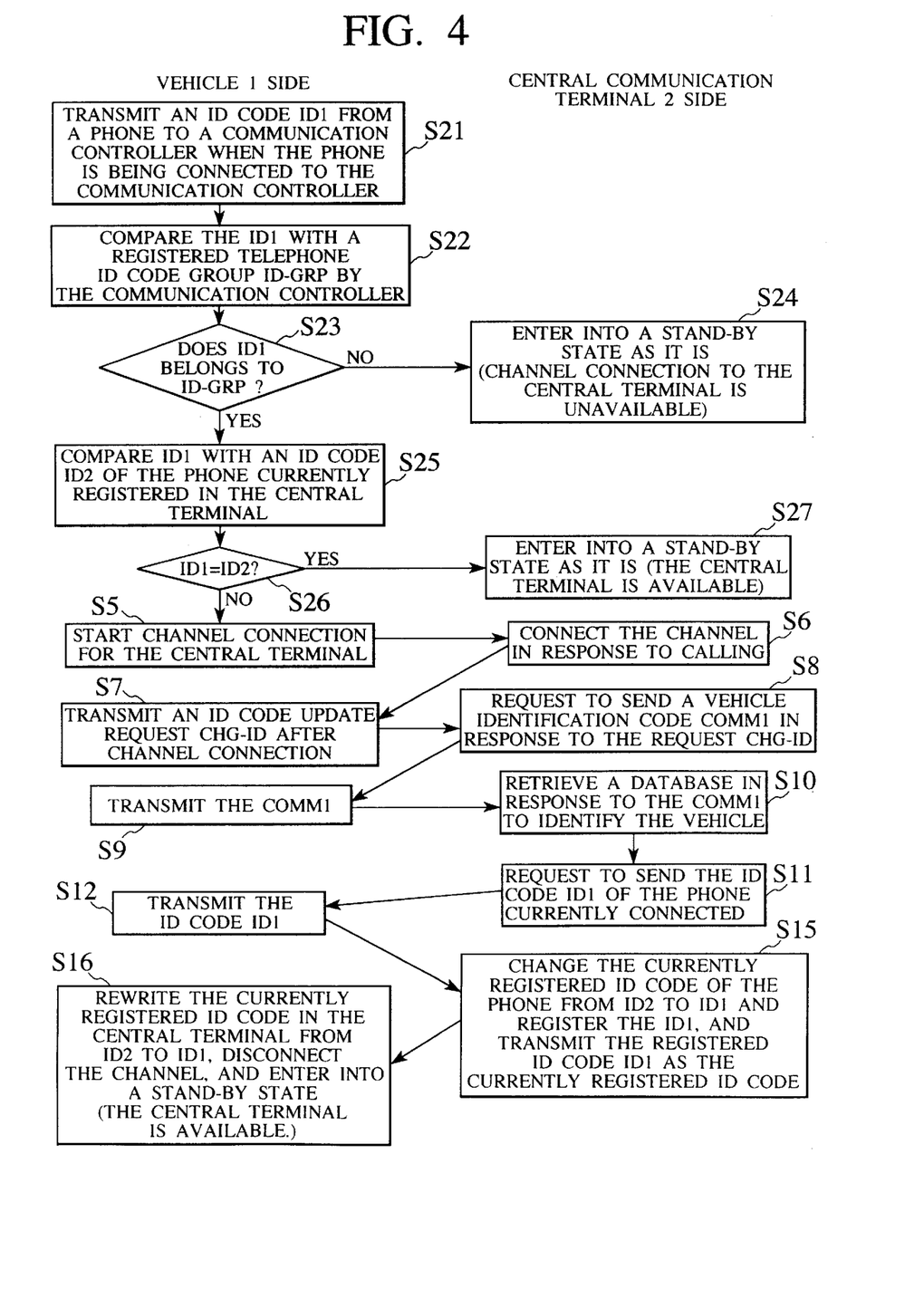
FIG. 4 is a flow chart illustrating operation of a vehicle information communication system according to the second embodiment of the present invention.

As shown in FIG. 3, in addition to the first information communication processor 11, the telephone number collator 12, the connector portion 13, the sound input processor 14, and the sound output processor 15, as in the first embodiment, the communication controller 10 is equipped with a telephone number group register 19 and a keyboard 17 used to register a telephone number group, This keyboard 17 may be composed of a hard system key, or a soft key displayed on a screen if the system is designed to employ a display.

There is registered in a database 27 of the central communication terminal 2, a data table in which vehicle identification codes of contract vehicles and telephone numbers of the portable telephones 102 used up to this time to execute the communication and are compared with each other. However, connectable telephone numbers of a plurality of portable telephones 102 with respect to the vehicle 1 are not registered.

Next, operation of the vehicle information communication system will be explained with reference to the flow chart in FIG. 4 hereunder. Prior to use of the vehicle information communication system, the telephone numbers of a plurality of portable telephones 102, which will be connected to the present communication system, are registered in the memory 18 of the communication controller 10 as the telephone number group ID-grp by use of the keyboard 17. In the memory 18, vehicle identification codes Comm1 such as a register number, owner name, type number, vehicle body number of the vehicle, etc., are registered, as well as the telephone number of the portable telephone 102 to be mainly used which is registered as an initial registered telephone number ID2. Thus an initial input registration is completed. After this, when the user intends to use the vehicle information communication system by connecting the portable telephone 102 to the communication controller 10, then processes will be executed according to the flow chart in FIG. 4.

More particularly, when the portable telephone 102 is connected to the communication controller 10, the telephone number collator 12 receives the telephone number as the phone number ID1 from the portable telephone 102 via the connector portion 13 (step S21). The telephone number ID1 is then compared with a registered telephone ID code group ID-Grp by the communication controller 10 (step S22). It is then determined whether or not the telephone number ID1 is included in the telephone number group ID-grp (step S23). If it is determined in step S23 that telephone number ID1 is not included in the telephone number group ID-grp, it is then determined that the portable telephone 102, which is not properly authorized, is connected. The central communication terminal 2 then enters into its stand-by state without executing further procedures. In this case, the channel connection to the central communication terminal 2 is unavailable (step S24).

Conversely, if it is determined in step S23 that the new telephone number ID1 is included in the telephone number group ID-grp, the telephone number collator 12 further compares the telephone number ID1 with a telephone number ID2 currently registered in the central communication terminal 2 (step S25). It is then determined whether or not the telephone number ID1 coincides with the telephone number ID2 (step S26).

If ID1=ID2 in step S26, the telephone number collator 12 informs the first information communication processor 11 of the satisfied collation. The first information communication processor 11 decides whether the portable telephone 102 is one being connected up to now, and then causes the communication controller 10 to enter into its stand-by state. In this case, the central communication terminal 2 is available since the portable telephone 102 is a regularly registered one (step S27).

On the contrary, if in step S26, ID1≠ID2, the telephone number ID1 is within the portable telephone 102NEW being scheduled beforehand, it is noted that it is different from that of the portable telephone 102 used previously. Therefore, the telephone number of the newly connected portable telephone 102NEW is registered in the central communication terminal 2 and is in correspondence with the concerned vehicle so as to enable two-way communications of vehicle information. Thereafter, like the procedures in the first embodiment, the procedures in steps S5 to S16 are carried out. The telephone number ID2 which is currently registered in the database 27 of the central communication terminal 2 is then rewritten to the telephone number ID1 of the newly connected portable telephone 102NEW. The telephone number ID2 is replaced with the telephone number ID1 (ID1←ID2). The telephone number TD1 is also registered in the memory 18 of the communication controller 10 as the new telephone number ID2. In the case of the second embodiment, since collation between the telephone number group ID-Grp and the new telephone number ID1 has already been conducted on the communication controller 10 side, collation steps S13 and 14 (See FIG. 2) between the ID-Grp and the new telephone number ID1 are not conducted on the central communication terminal 2 side.

In the vehicle information communication system according to the second embodiment, even if the same vehicles are used by a plurality of users who have their own portable telephones 102, 102NEW respectively, there is no necessity to purposely exchange a portable telephone which is usually used although not registered, with another portable telephone which is registered when the user drives the vehicle. As a result, the convenience of the vehicle information communication system is improved. Furthermore, since the telephone numbers of the portable telephones which are scheduled to be used are previously registered in the telephone number group ID-Grp of the memory 18 of the communication controller 10, telephone numbers other than such scheduled telephone numbers cannot use the present vehicle information communication system, so there is no possibility of adversely affecting information security.

In the above embodiments, regular users have been identified by the vehicle identification code Comm1, but PIN codes peculiar to the users and registered previously in the central communication terminal 2 may be employed. In other words, if a new telephone number is transmitted to the central communication terminal 2, the second information communication processor 22 in the central communication terminal 2 requests the user to send the PIN code. The requested user transmits the PIN code by pushing the push buttons of the telephone, or the like. The second information communication processor 22 receives the number if the transmitted PIN code coincides with the registered one, but disconnects the channel unless the transmitted PIN code coincides with the registered ones.

While the present invention has been described with reference to certain preferred embodiments, variations thereon will become obvious to those skilled in the art. Therefore, the invention is not to be considered as limited to said preferred embodiments.

What is claimed is:

1. A communication system for communicating information between a central communication terminal and a vehicle, comprising:
   a) a communication device having an identifier code peculiar to each communication device, the identifier code including a telephone number of the communication device;
   b) a communication controller disposed in said vehicle to control communication with said central communication terminal, the communication controller being connectable to said communication device;
   c) said communication controller having command logic that commands the communication device to transmit said identifier code to the central communication terminal in response to connection of the communication device with the communication controller;
   d) a communication apparatus disposed in the central communication terminal for transmitting/receiving information to/from said communication device, the communication apparatus adapted to receive the identifier code sent by the communication device; and
   e) a first memory disposed in the communication apparatus for storing the identifier code received by the communication apparatus, wherein
   the communication apparatus has paging logic that pages said communication device using the identifier code stored in said first memory and dials the telephone number corresponding to the stored identifier code.

2. The communication system according to claim 1, further comprising a connection sensor disposed in the communication controller to detect the connection of the communication device to the communication controller.

3. The communication system according to claim 1, wherein said communication device is detachable from the communication controller and operable separately from the vehicle.

4. The communication system in a central communication terminal for communicating with a vehicle, comprising:
   a communication apparatus for transmitting/receiving information to/from a communication device disposed in a vehicle, the communication apparatus receiving an identifier code sent by the communication device, the identifier code including a telephone number of the communication device; and
   a memory for storing the identifier code received by the communication apparatus, wherein
   the communication apparatus pages the communication device using the identifier code stored in the memory and dials the telephone number corresponding to the stored identifier code.

5. A communication system according to claim 4, wherein said communication device is a portable telephone.

6. A communication system for communication information between a central communication terminal and a vehicle, comprising:
   a) a communication device having an identifier code peculiar to each communication device;
   b) a communication controller disposed in said vehicle to control communication with said central communication terminal, the communication controller being connectable to said communication device;
   c) said communication controller having command logic that command logic that commands the communication device to transmit said identifier code to the central communication terminal in response to connection of the communication device with the communication controller;
   d) a communication apparatus disposed in the central communication terminal for transmitting/receiving information to/from said communication device, the communication apparatus adapted to receive the identifier code sent by the communication device;
   e) a first memory disposed in the communication apparatus for storing the identifier code received by the communication apparatus; and
   f) a memory coupled to said central communication terminal for storing a plurality of identifier codes, each identifier code being authorized by an occupant of the vehicle, wherein the communication apparatus has paging logic that pages said communication device using the identifier code stored in said first memory, and the communication controller and the communication apparatus communicate therebetween when the identifier code of the communication device connected to the communication controller is identical to one of the identifier codes stored in the memory.

7. A communication system for communicating information between a central communication terminal and a vehicle, comprising:

a) a communication device having an identifier code peculiar to each communication device;

b) a communication controller disposed in said vehicle to control communication with said central communication terminal, the communication controller being connectable to said communication device;

c) said communication controller having command logic that commands the communication device to transmit said identifier code to the central communication terminal in response to connection of the communication device with the communication controller;

d) a communication apparatus disposed in the central communication terminal for transmitting/receiving information to/from said communication device, the communication apparatus adapted to receive the identifier code sent by the communication device; and e) a first memory disposed in the communication apparatus for storing the identifier code received by the communication apparatus, wherein the communication apparatus has paging logic that pages said communication device using the identifier code stored in said first memory, and the communication controller includes:

a secondary memory disposed in the communication controller, for storing the identifier code of the communication device connected to the communication controller, and a first comparator for comparing the identifier code of the communication device which is connected to the communication controller and the identifier code of the communication device last connected so said communication controller.

8. The communication system according to claim 7, wherein the communication controller includes logic that commands a communication device to transmit the identifier code of the communication device currently connected to the communication controller when the first comparator detects that the identifier codes are not identical to each other.

9. The communication system according to claim 7, further comprising:

a group memory disposed in the communication apparatus of the central communication terminal for storing a plurality of identifier codes, each identifier code being authorized by an occupant of the vehicle; and a second comparator for comparing the identifier code received by the communication apparatus and the identifier codes stored in the first memory, wherein the first memory updates the identifier code to the latest identifier code received.

10. The communication system according to claim 7, further comprising:

a first vehicle memory disposed in the vehicle for storing an identification number to identify the vehicle;

the communication controller including transmit command logic that commands the communication device to transmit the identification number in response to a request signal from the communication apparatus of the central communication terminal;

a second vehicle memory disposed in the communication apparatus, for storing the identification number of the vehicle; and a third comparator disposed in the communication controller for comparing the identification number sent from the communication device and the identification number stored in the second vehicle memory, wherein the communication apparatus transmits the request signal for the identification number when the identifier code is transmitted from the vehicle, and the first memory updates the identifier code to the latest received identifier code when both identification number compared by the third comparator are identical.

11. The communication system according to claim 7, further comprising:

a group memory disposed in the vehicle for storing a plurality of identifier codes, each identifier code being authorized by an occupant of the vehicle; and a fourth comparator for comparing the stored identifier codes and the identifier code of the communication device which is currently connected to the communication controller, wherein the second memory renews the identifier code to the identifier code of the currently connected communication device when the fourth comparator detects that the identifier code of the connected communication device is identical to one of the stored identifier codes.

12. The communication system according to claim 11, wherein the communication apparatus in the central communication terminal further comprises:

a fifth comparator for comparing the identifier code stored in the first memory and the identifier code transmitted from the communication device which is currently connected to the communication controller, and wherein the first memory renews the identifier code to the code from the current connected communication device when the fifth comparator judges that the two identifier codes are not identical to each other.

13. The communication system according to claim 11, further comprising:

an input device disposed in a vehicle to be operated by an occupant of the vehicle inputting the identifier code to the group memory.

14. The communication system according to claim 11, further comprising;

a vehicle status sensor for detecting that an accident has occurred;

wherein the communication controller includes logic that commands the communication device to report the accident to the central communication terminal.

15. The communication system according to claim 11, wherein the communication device comprises a cellular telephone having a telephone number as the identifier code.

16. The communication system according to claim 11, further comprising means to delete identifier codes from memory.

17. The communication system according to claim 11, further comprising a memory disposed in the vehicle having said identifier codes stored therein.

18. A communication system for communicating information between a central communication terminal and a vehicle, comprising:
   a) a communication device having an identifier code peculiar to each communication device;
   b) a communication controller disposed in said vehicle to control communication with said central communication terminal, the communication controller being connectable to said communication device;
   c) said communication controller having command logic that commands the communication device to transmit said identifier code to the central communication terminal in response to connection of the communication device with the communication controller;
   d) a communication apparatus disposed in the central communication terminal for transmitting/receiving information to/from said communication device, the communication apparatus adapted to receive the identifier code sent by the communication device;
   e) a first memory disposed in the communication apparatus for storing the identifier code received by the communication apparatus; and
   f) a memory having stored therein a plurality of identifier codes, each identifier code being authorized by an occupant of the vehicles, wherein the communication apparatus has paging logic that pages said communication device using the identifier code stored in said first memory, and the communication controller and the communication apparatus communicate therebetween when the identifier code of the communication device connected to the communication controller is identical to one of the identifier codes stored in the memory.

* * * * *